US012206304B2

United States Patent
Isobe et al.

(10) Patent No.: US 12,206,304 B2
(45) Date of Patent: Jan. 21, 2025

(54) ROTARY ELECTRIC MACHINE AND METHOD OF MANUFACTURING ROTARY ELECTRIC MACHINE

(71) Applicant: MITSUBISHI HEAVY INDUSTRIES, LTD., Tokyo (JP)

(72) Inventors: Shinichi Isobe, Tokyo (JP); Masahiko Ezumi, Tokyo (JP); Mikito Sasaki, Tokyo (JP); Masahiro Nii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 248 days.

(21) Appl. No.: 17/801,908

(22) PCT Filed: Jan. 18, 2021

(86) PCT No.: PCT/JP2021/001451
§ 371 (c)(1),
(2) Date: Aug. 24, 2022

(87) PCT Pub. No.: WO2022/153530
PCT Pub. Date: Jul. 21, 2022

(65) Prior Publication Data
US 2023/0085134 A1    Mar. 16, 2023

(51) Int. Cl.
*H02K 21/24* (2006.01)
*H02K 1/02* (2006.01)
*H02K 1/2793* (2022.01)
*H02K 3/47* (2006.01)

(52) U.S. Cl.
CPC ............... *H02K 21/24* (2013.01); *H02K 1/02* (2013.01); *H02K 1/2793* (2013.01); *H02K 3/47* (2013.01)

(58) Field of Classification Search
CPC ........ H02K 21/24; H02K 1/02; H02K 1/2793; H02K 3/47
See application file for complete search history.

(56) References Cited

U.S. PATENT DOCUMENTS

| 7,129,608 | B2 | 10/2006 | Eppler et al. | |
|---|---|---|---|---|
| 10,554,082 | B2 | 2/2020 | Watanabe et al. | |
| 2004/0245872 | A1* | 12/2004 | Eppler | H02K 1/148 |
| | | | | 310/216.074 |
| 2008/0136282 | A1 | 6/2008 | Okazaki et al. | |

(Continued)

FOREIGN PATENT DOCUMENTS

| JP | 5-268754 | 10/1993 |
|---|---|---|
| JP | 8-126277 | 5/1996 |

(Continued)

OTHER PUBLICATIONS

International Search Report issued Mar. 23, 2021 in corresponding International (PCT) Application No. PCT/JP2021/001451.

(Continued)

*Primary Examiner* — Terrance L Kenerly
(74) *Attorney, Agent, or Firm* — Wenderoth, Lind & Ponack, L.L.P.

(57) ABSTRACT

An axial-gap coreless rotary electric machine includes rotors, stators, and a case. Armature coils of the stators include a first coil segment and a second coil segment facing the first coil segment. The case includes a first case segment and a second case segment facing the first case segment.

11 Claims, 13 Drawing Sheets

(56) References Cited

U.S. PATENT DOCUMENTS

2013/0328429 A1    12/2013  Enomoto et al.
2017/0256999 A1*    9/2017  Turner .................. H02K 21/24
2019/0386551 A1*   12/2019  Sasaki ..................... H02K 3/28

FOREIGN PATENT DOCUMENTS

| JP | 11-187635   | 7/1999  |
|----|-------------|---------|
| JP | 2003-174742 | 6/2003  |
| JP | 2004-364494 | 12/2004 |
| JP | 2011-223652 | 11/2011 |
| JP | 2012-157157 | 8/2012  |
| JP | 2016-208817 | 12/2016 |
| JP | 2018-193838 | 12/2018 |
| JP | 2019-221124 | 12/2019 |
| WO | 2006/068042 | 6/2006  |

OTHER PUBLICATIONS

International Preliminary Report on Patentability issued Jul. 4, 2023 in corresponding International (PCT) Application No. PCT/JP2021/001451.
Japan Office Action issued Jun. 20, 2023 in corresponding Japanese Patent Application No. 2019-211184.

* cited by examiner

ROTARY ELECTRIC MACHINE AND METHOD OF MANUFACTURING ROTARY ELECTRIC MACHINE

TECHNICAL FIELD

The present disclosure relates to an axial-gap coreless rotary electric machine.

BACKGROUND ART

A rotary electric machine is used as a generator that serves as a supply source of power and as an electric motor that generates rotational energy based on supplied power. In other words, rotary electric machine is a general term for a generator and an electric motor. The rotary electric machine and an apparatus that rotates by being coupled with the rotary electric machine through a shaft, for example, a turbine or a compressor are desired to be downsized with their higher speeds.

As a kind of rotary electric machine, an axial-gap rotary electric machine is widely known. For example, as disclosed in JP 2012-157157 A, the axial-gap rotary electric machine includes rotors and stators that are disposed to face each other in an axial direction. The axial-gap rotary electric machine including a combination of a plurality of rotors and a plurality of stators can achieve higher speed.

SUMMARY OF INVENTION

Technical Problem

Vibration with rotation of the rotors is one of issues for increasing the speed of the rotary electric machine. One of causes of the vibration is imbalance of the rotors to a rotary shaft. In particular, in the rotary electric machine including the combination of the plurality of rotors and the plurality of stators, vibration caused by imbalance of the rotors may become pronounced.

Accordingly, an object of the present disclosure is to provide a technique that suppresses vibration during rotational operation in the rotary electric machine including a combination of a plurality of rotors and a plurality of stators.

Solution to Problem

An axial-gap coreless rotary electric machine according to the present disclosure includes rotors, stators, and a case.

In the rotors, field magnets are fixed to a rotary shaft with intervals in an axial direction. The stators each include a plurality of armature coils disposed to face the field magnets. The case is configured to house the rotors and the stators and to rotatably support the rotary shaft.

In the present disclosure, the armature coils of each of the stators include a first coil segment and a second coil segment disposed to face the first coil segment.

In the present disclosure, the case includes a first case segment and a second case segment disposed to face the first case segment.

The present disclosure provides a method of manufacturing the above-described axial-gap coreless rotary electric machine including the rotors, the stators, and the case. The manufacturing method includes the following first step, second step, and third step.

First step: preparing a first case segment including a plurality of first coil segments disposed at predetermined positions.

Second step: disposing the rotors in which the field magnets are attached to the rotary shaft, at predetermined positions of the first case segment.

Third step: abutting a second case segment including a plurality of second coil segments disposed at predetermined positions, to the first case segment.

In the manufacturing method according to the present disclosure, the case includes the first case segment and the second case segment, and the armature coils include the first coil segment and the second coil segment.

Advantageous Effects of Invention

According to the present disclosure, the case is divided into the first case segment and the second case segment, and the armature coils of each of the stators are divided into the first coil segment and the second coil segment. As a result, the rotors in which the field magnets are attached to the rotary shaft can be integrally disposed in the first case segment including the plurality of first coil segments disposed at the predetermined positions. Accordingly, balance of the rotors disposed in the first case segment can be integrally adjusted. As a result, in the rotary electric machine including a combination of a plurality of rotors and a plurality of stators, it is possible to suppress vibration caused by imbalance of the rotors.

DESCRIPTION OF EMBODIMENTS

Some embodiments are described below with reference to accompanying drawings.

First Embodiment

Figure 7:
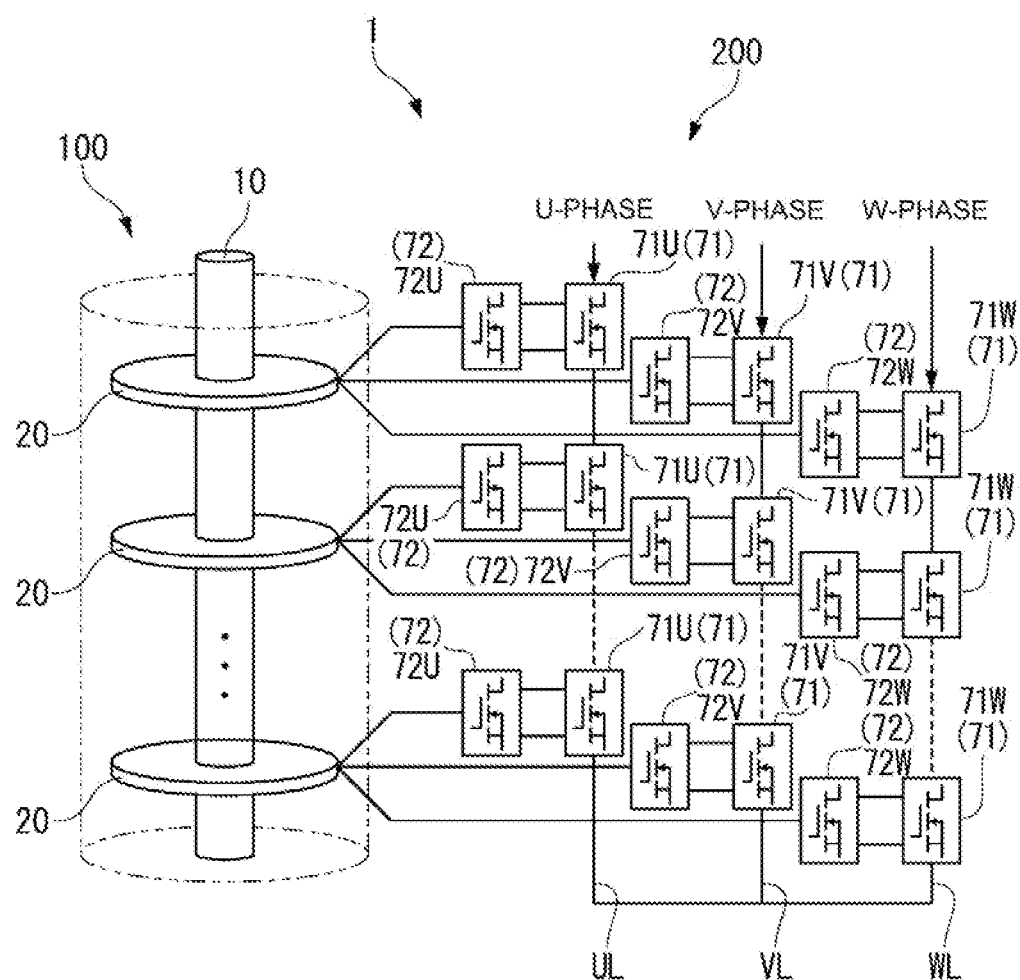
FIG. 7 is a diagram illustrating a schematic configuration of a rotary electric machine system according to the first embodiment.

As illustrated in FIG. 7, a rotary electric machine system 1 according to a first embodiment includes a rotary electric machine 100 and a power converter 200. As the rotary electric machine according to the first embodiment, an axial-gap electric motor is adopted. The electric motor is an alternating-current electric motor including a combination of a plurality of rotors and a plurality of stators, and can suppress vibration during high-speed rotation. The rotary electric machine 100 can be applied to a generator.

In the following, the configuration of the rotary electric machine system 1 is described in order of the rotary electric machine 100 and the power converter 200. Thereafter, a procedure of manufacturing the rotary electric machine 100 is described.

[Rotary Electric Machine 100]

Figure 1:
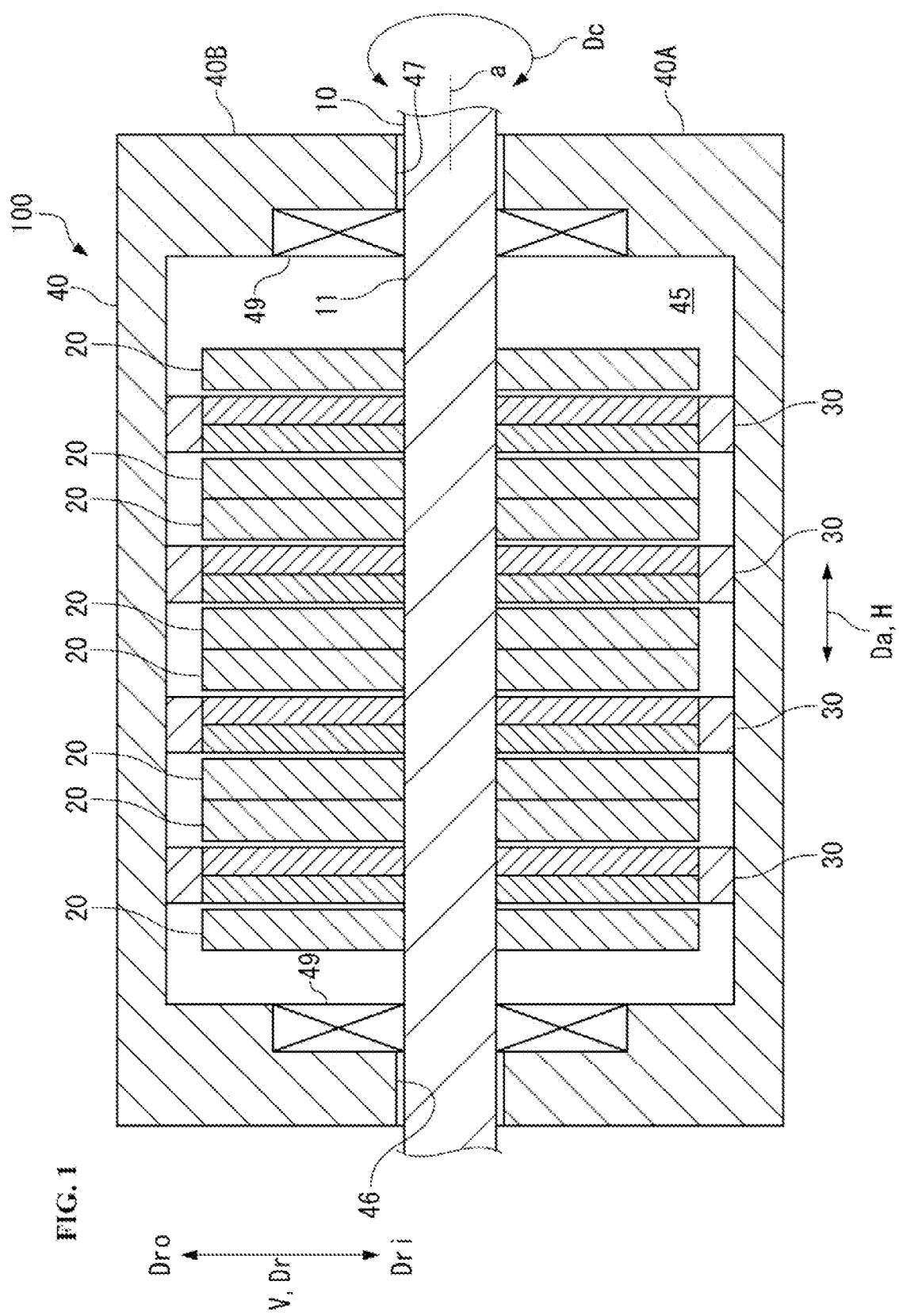
FIG. 1 is a vertical cross-sectional view illustrating a schematic configuration of a rotary electric machine according to a first embodiment of the present disclosure.

As illustrated in FIG. 1, the rotary electric machine 100 includes a rotary shaft 10, rotors 20 fixed to the rotary shaft 10 and rotating with the rotary shaft 10, and stators 30 disposed to face the rotors 20 in an axial direction Da. The rotary electric machine 100 further includes a case 40 that houses the rotors 20 and the stators 30, and rotatably supports the rotary shaft 10.

In the rotary electric machine 100, every two rotors 20 are disposed in contact with each other, and every two stators 30 are disposed in contact with each other, so that the rotors 20 and the stators 30 are disposed as many as possible in the axial direction Da.

[Rotary Shaft 10]

As illustrated in FIG. 1, the rotary shaft 10 is supported by the case 40 to be rotatable around an axis a, through bearings 49, when the rotary electric machine 100 is driven, rotational energy is generated in the rotary shaft 10, which drives a rotary machine, for example, a compressor or a turbine, directly or indirectly connected to the rotary shaft 10.

The rotary shaft 10 transmits the rotational energy generated in the rotary electric machine 100 to an external load, and is made of, for example, a metal material so as to have strength durable thereto.

[Rotor 20]

As illustrated in FIG. 1, the rotors 20 each extend from an outer peripheral surface 11 of the rotary shaft 10 toward an outside in a radial direction Dr with the axis a as a center (hereinafter, simply referred to as radial-direction outside Dro). In other words, the rotors 20 are rotatable around the axis a with the rotary shaft 10. Each of the rotors 20 exemplified here is formed in a disk shape around the axis a as the center, and includes a permanent magnet not illustrated in FIG. 1 at a center in the radial direction Dr. In the rotary electric machine 100 according to the present embodiment, the plurality of rotors 20 are provided with intervals in the axial direction Da, Note that, at a part on the radial-direction outside Dro from the permanent magnet in each of the rotors 20, a reinforcing member reinforcing the corresponding rotor 20 against centrifugal force acting during rotation of the corresponding rotor 20 may be disposed. As illustrated in FIG. 1, the rotors 20 paired to face each other in the axial direction Da are disposed to sandwich the corresponding stators 30 therebetween. The radial direction Dr extends along a vertical direction V, and the axial direction Da extends along a horizontal direction H.

Figure 2:
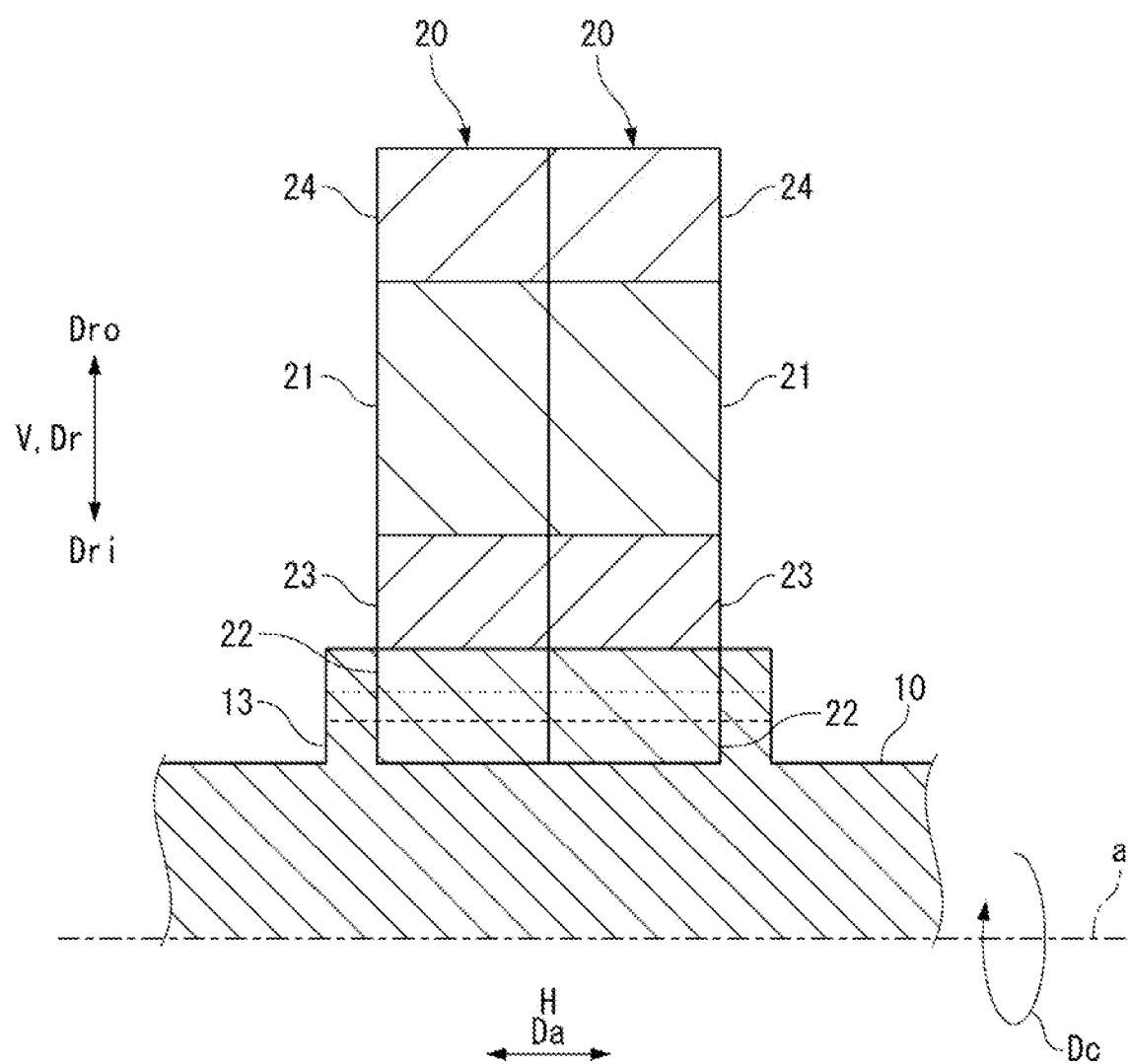
FIG. 2 is a vertical cross-sectional view illustrating a rotor according to the first embodiment.
Figure 3:
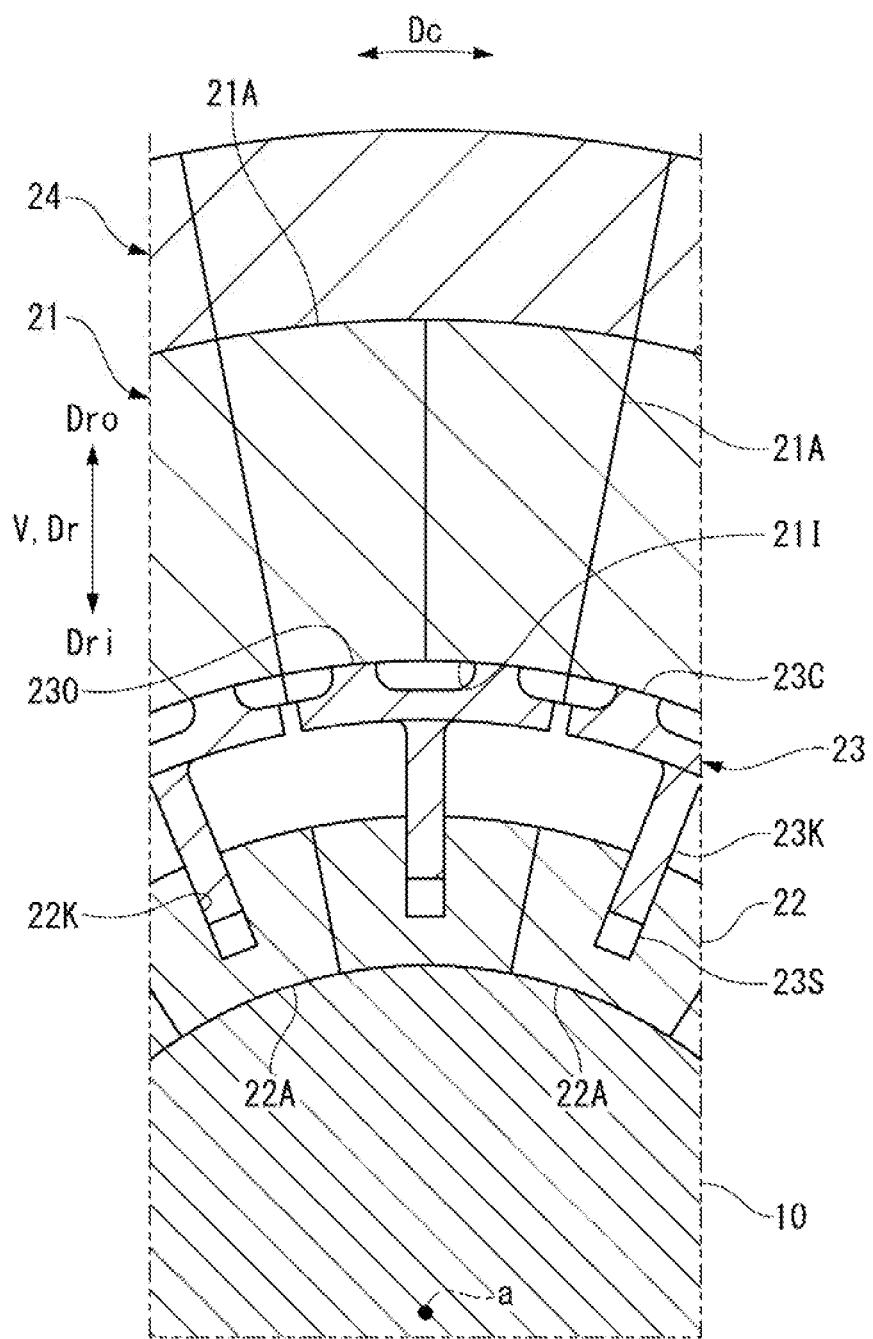
FIG. 3 is a cross-sectional view illustrating the rotor according to the first embodiment.

A preferred example of the rotors 20 is descried with reference to FIG. 2 and FIG. 3.

Each of the rotors 20 includes an inner ring portion 22 provided on an inside in the radial direction Dr, and a torque transmission portion 23 provided on an outside of the inner ring portion 22. Each of the rotors 20 further includes a field magnet 21 provided on an outside of the torque transmission portion 23, and an outer ring Portion 24 provided on an outside of the field magnet 21, The field magnet 21 includes a permanent magnet.

The inner ring portion 22 is fixed to the rotary shaft 10. As illustrated in FIG. 3, the inner ring portion 22 includes a plurality of trapezoidal fan-shaped first blocks 22A arranged in a circumferential direction Dc. As illustrated in FIG. 2, these first blocks 22A are fastened to a convex portion 13 provided on the outer peripheral surface 11 of the rotary shaft 10 by fastening tools such as bolts. The inner ring portion 22 according to the present embodiment can be made of a synthetic resin such as a phenolic resin. Alternatively, the inner ring portion 22 can be made of a composite material such as carbon fiber reinforced plastic. As illustrated in FIG. 3, each of these first blocks 22A includes a key groove 22K that is formed so as to be recessed toward a radial-direction inside Dri, on an outer peripheral surface directed toward the radial-direction outside Dro.

The torque transmission portion 23 presses the field magnet 21 toward the radial-direction outside Dro, and transmits torque acting on the field magnet 21 in a rotation direction around the axis a as the center, to the rotary shaft 10. In other words, during rotation of the rotors 20, the torque transmission portion 23 efficiently transmits the torque in the rotation direction of the field magnet 21 to the rotary shaft 10 through displacement and deformation of the field magnet 21 caused by centrifugal force. The torque transmission portion 23 includes keys 23K, springs 23S, and a contact surface 23C.

Ends of the keys 23K are disposed in the above-described respective key grooves 22K, and are slidable in the radial direction Dr. In other words, the keys 23K are provided so as to be retractable from the respective key grooves 22K in the radial direction Dr.

The keys 23K are biased by the respective springs 23S toward the radial-direction outside Dro. The springs 23S are illustrated as voids in FIG. 3; however, for example, each of the springs 23S can be disposed in a compressed state between an end of the corresponding key 23K on the radial-direction inside Dri and a bottom part of the corresponding key groove 22K. As the springs 23S, for example, coil springs are usable. The springs 23S may be other elastic members such as plate springs as long as the keys 23K can be biased by the springs toward the radial-direction outside Dro.

The contact surface 23C has an outer surface 23O parallel to an inner peripheral surface 21I in the radial direction Dr of the field magnet 21 disposed in a ring shape. The contact surface 23C is pressed against the inner peripheral surface 21I of the field magnet 21 by the keys 23K from the radial-direction inside Dri toward the radial-direction outside Dro. As a result, the entire outer surface 23O comes into surface contact with the inner peripheral surface 21I. The inner peripheral surface 21I of the field magnet 21 according to the present embodiment is formed in a cylindrical shape around the axis a as the center. The outer surface 23O of the contact surface 23C has a radius of curvature equivalent to a radius of curvature of the inner peripheral surface 21I as viewed from the axial direction Da.

The field magnet 21 is formed in a ring shape around the axis a as the center. The field magnet 21 includes a plurality of trapezoidal fan-shaped magnetic blocks 21A arranged in the circumferential direction Dc. The magnetic blocks 21A are arranged such that every adjacent two of the magnetic blocks 21A have magnetic poles opposite to each other.

The outer ring portion 24 functions as a reinforcing member reinforcing the rotor 20 against centrifugal force acting during rotation of the rotor 20. In other words, the outer ring portion 24 prevents the field magnet 21 from being displaced toward the radial-direction outside Dro by the centrifugal force and the like. The outer ring portion 24 according to the present embodiment is formed in a ng-shape covering the field magnet 21 from the radial-direction outside Dro. The outer ring portion 24 can be made of a composite material such as carbon fiber reinforced plastic.

Therefore, in each of the rotors 20, the contact surface 23C is biased against the inner peripheral surface 21I toward the radial-direction outside Dro. Therefore, even when the centrifugal force acts on the field magnet 21, the state where the entire outer surface 23O of the contact surface 23C is in surface contact with the inner peripheral surface 21I of the field magnet 21 can be maintained. As a result, possible to prevent torque transmission force between the field magnet 21 and the rotary shaft 10 from being deteriorated.

Note that the case where each of the rotors 20 includes the inner ring portion 22 is described; however, for example, the key grooves 22K of the inner r portion 22 may be formed in the rotary shaft 10, and the inner ring portion 22 may be omitted.

[Stator 30]

Next, the stators 30 are described with reference to FIG. 4, FIG. 5, and FIG. 6.

Figure 4:
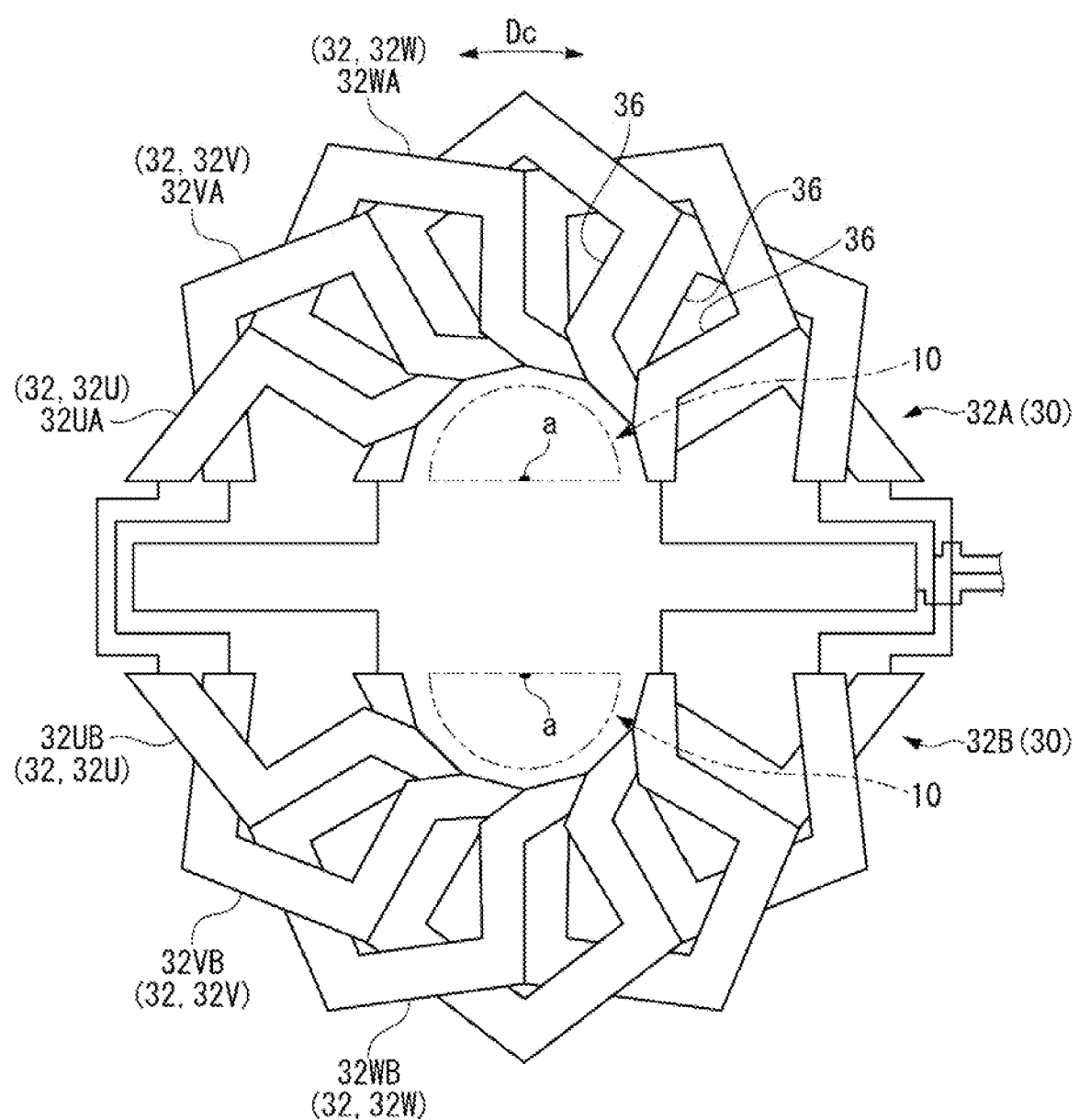
FIG. 4 is a diagram illustrating coils configuring a stator according to the first embodiment in an axial direction.

As illustrated in FIG. 4, each of the stators 30 includes, as main components, armature coils 32 that include a first coil segment 32A and a second coil segment. 32B divided in half in the circumferential direction Dc. FIG. 4 illustrates the first coil segment 32A and the second coil segment 32B separated by a certain distance in order to clearly illustrate that the first coil segment 32A and the second coil segment 32B are divided; however, the first coil segment 32A and the second coil segment 32B are actually provided with an appropriate gap. The gap serves as a flow path of cooling medium cooling the armature coils 32, and promotes cooling of the armature coils 32.

In the present disclosure, the term "segment" means a portion divided from one member. In the case of the armature coils 32, the first coil segment 32A, and the second coil segment 32B, for example, each armature coil 32 corresponds to the "one member", and the first coil segment 32A and the second coil segment 32B each correspond to the "one portion divided from one member". This is true of segments in the case 40.

The armature coils 32 of the rotary electric machine 100 driven by alternating-current power include a first coil 32U, a second coil 32V, and a third coil 32W for three phases. The first coil 32U, the second coil 32V, and the third coil 32W for the three phases include coil elements 32UA, 32VA, and 32WA belonging to the first coil segment 32A, and coil elements 32UB, 32VB, and 32WB belonging to the second coil segment 32B. In the following description, in a case where it is unnecessary to distinguish the phases of the coils 32U, 32V, and 32W, the coils 32U, 32V, and 32W are simply collectively referred to as the armature coils 32 in some cases. Further, in a case where it is unnecessary to distinguish the coil elements 32UA, 32VA, and 32WA from the coil elements 32UB, 32VB, and 32WB, the coil elements 32UA, 32VA, and 32WA and the coil elements 32UB, 32VB, and 32WB are referred to as the coils 32U, 32V, and 32W in some cases.

The coils 32U, 32V and 32W are formed of a metal material excellent in electric conductivity, for example, copper or a copper alloy, in the same shape. These coils 32U, 32V, and 32W for the three phases are disposed so as to overlap with one another in the axial direction Da (front-rear surface direction on paper surface in FIG. 4) in the armature coils 32. These coils 32U, 32V, and 32W for the three phases are different in phase around the axis a from one another. In the present embodiment, the phases of these coils 32U, 32V, and 32W for the three phases are different by 30 degrees. Note that insulation coating films are provided on surfaces of the coils 32U, 32V, and 32W, and the coils 32U, 32V, and 32W are electrically insulated from one another.

Both ends of the coil element 32UA are electrically connected to both ends of the coil element 32UB, and one ends of the coil elements 32UA and the coil element 32UB, for example, ends on a right side in the drawing are connected to a U-phase of the power converter 200 described below through a terminal or the like. This is true of the coil element 32VA and the coil element 32VB, and the coil element 32WA and the coil element 32WB.

Figure 5:
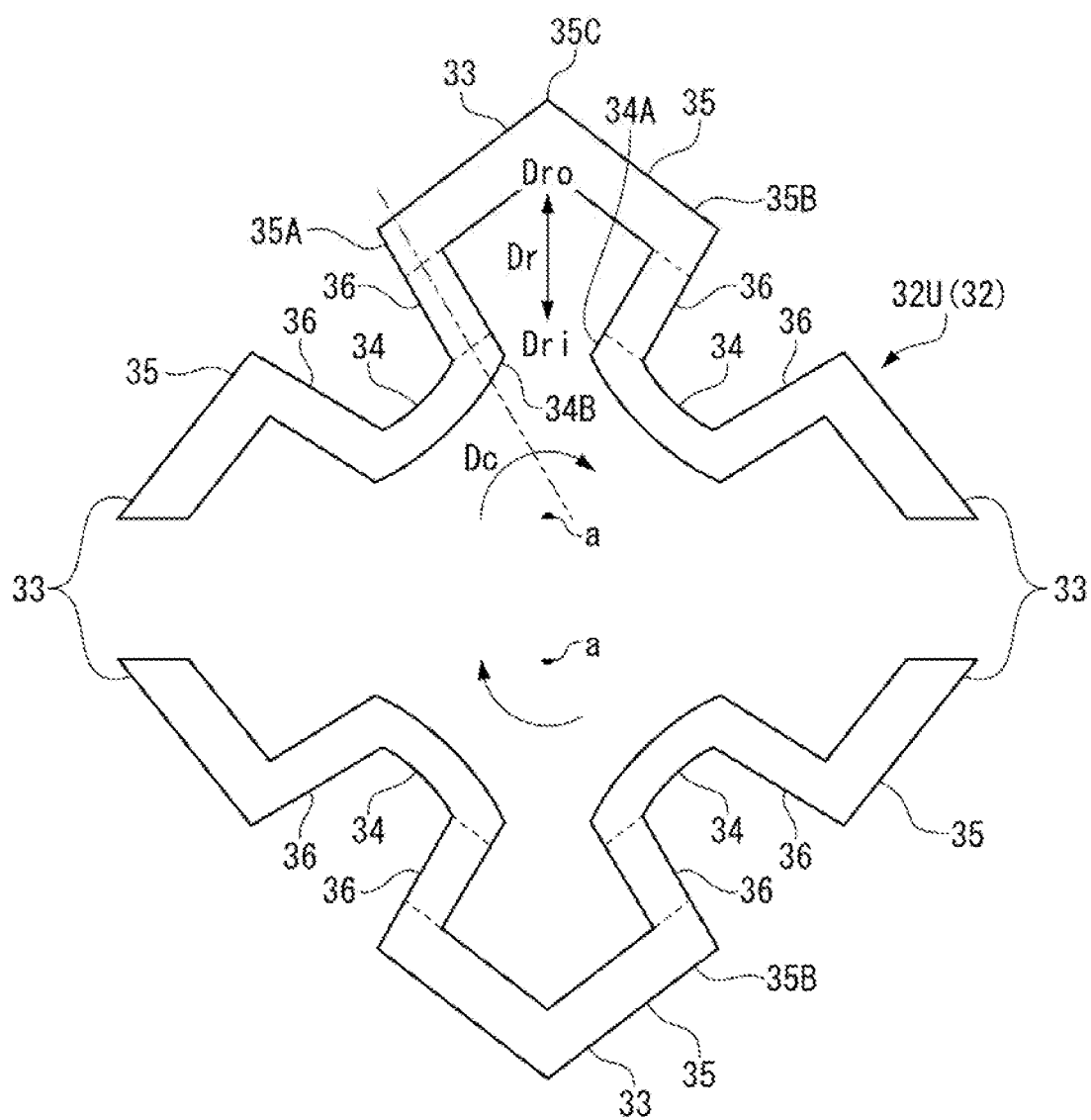
FIG. 5 is a diagram illustrating a coil for one phase extracted from the coils according to the first embodiment.

As illustrated in FIG. 5, the armature coil 32 for one phase includes four winding portions 33 each formed so as to protrude toward the radial-direction outside Dro around the axis a as the center. These four winding portions 33 are provided every 180 degrees in the circumferential direction Dc around the axis a as the center.

Each armature coil 32 includes inner coil ends 34, outer coil ends 35, and coil slots 36.

The inner coil ends 34 extend in the circumferential direction. Dc. The inner coil ends 34 are disposed at positions close to the axis a in each armature coil 32. In the present embodiment, four inner coil ends 34 are provided and are disposed with equal intervals in the circumferential direction Dc. The inner coil ends 34 exemplified in the present embodiment are each formed in a curved shape protruding toward the radial-direction inside Dri as viewed from the axial direction. Da. Each of the inner coil ends 34 has a rectangular cross-section perpendicular to an extending direction of the inner coil end 34.

The outer coil ends 35 are disposed on the radial direction outside Dro from the inner coil ends 34. The outer coil ends 35 extend in the circumferential direction Dc. In the present embodiment, four outer coil ends 35 are provided and are disposed with equal intervals in the circumferential direction Dc. One end part 35A of each of the outer coil ends 35 in the circumferential direction is disposed to overlap with the other end part 34B of the corresponding inner coil end 34 in the circumferential direction, as viewed from the radial-direction outside Dro.

Likewise, the other end part 35B of each of the outer coil ends 35 in the circumferential direction is disposed to overlap with one end part 34A of the corresponding inner coil end 34 in the circumferential direction as viewed from the radial-direction outside Dro. The outer coil ends 35 exemplified in the present embodiment are each formed in an L-shape in which a corner part 35C is disposed at a center in the circumferential direction Dc as viewed from the axial direction Da. Further, as with each of the inner coil ends 34, each of the outer coil ends 35 has a rectangular cross-section perpendicular to an extending direction of the outer coil end 35. Note that the cross-sectional shape of each of the outer coil ends 35 is not limited to the above-described shape.

Each of the coil slots 36 extends in the radial direction Dr, and electrically connects the one end part 34A of the adjacent inner coil end 34 and the other end part 35B of the adjacent outer coil end 35, and electrically connects the other end part 34B of the adjacent inner coil end 34 and the one end part 35A of the adjacent outer coil end 35. The coil slots 36 according to the first embodiment linearly extend in the radial direction Dr.

Figure 6:
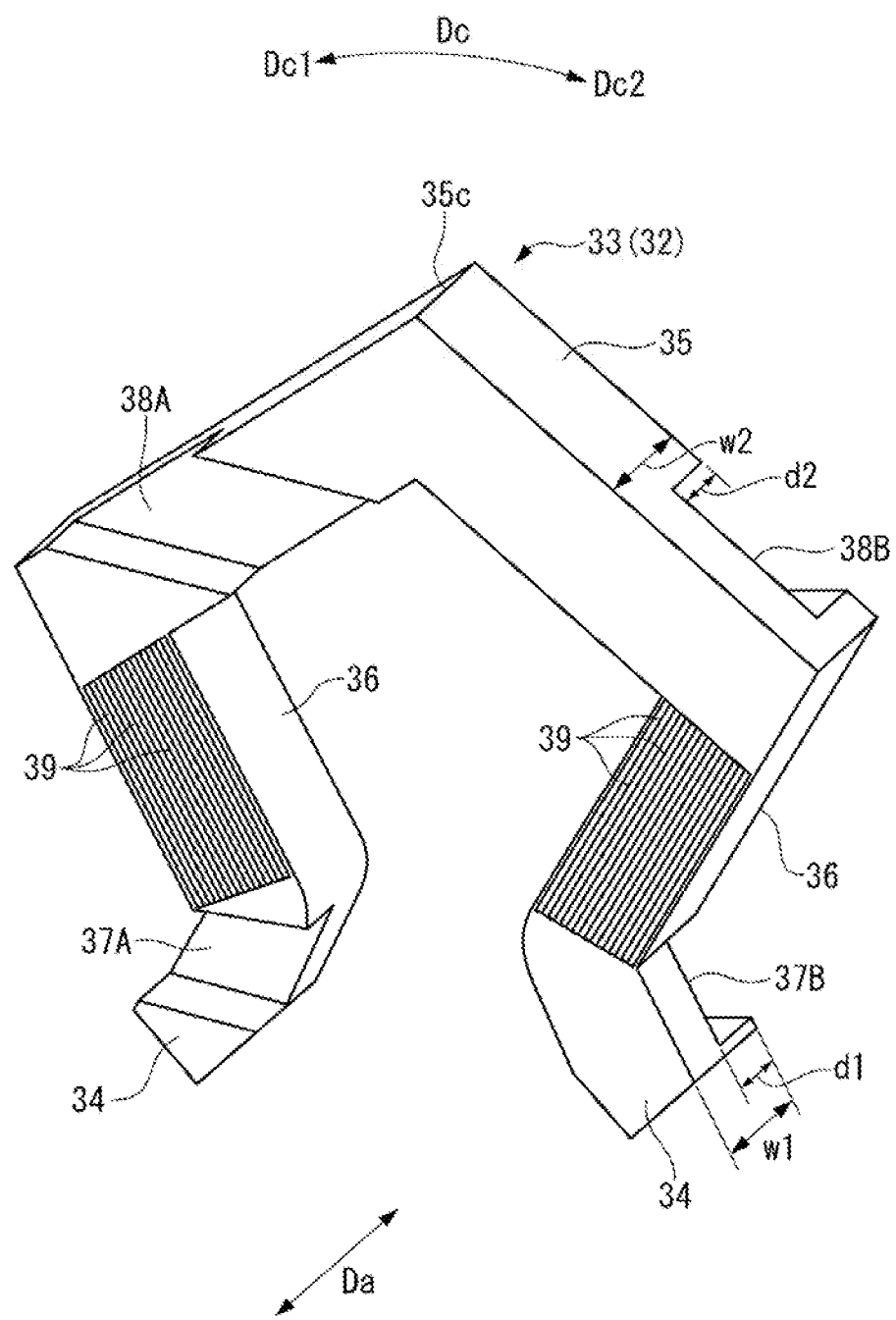
FIG. 6 is a perspective view illustrating one winding portion of the coil according to the first embodiment.

FIG. 6 is a perspective view illustrating one winding portion 33 and a vicinity thereof in one coil according to the first embodiment of the present disclosure.

As illustrated in FIG. 6, each of the inner coil ends 34 includes an inner notch portion 37A and an inner notch portion 37B at positions (see FIG. 4) overlapping with the inner coil ends 34 of the armature coils 32 for the other phases adjacent in the axial direction Da, as viewed from the axial direction Da. In a case where the armature coil 32 illustrated in FIG. 6 is the coil 32V, the armature coils 32 for the other phases correspond to the coil 32U and the coil 32W (see FIG. 4).

Each of the inner notch portions 37A and 37B houses the corresponding inner coil end 34 of the armature coil 32 for the other phase from the axial direction Da. Each of the inner notch portions 37A and 37B exemplified in the present embodiment has a square groove shape having a width slightly greater than a width of the corresponding inner coil end 34 of the armature coil 32 for the other phase. A depth dimension d1 of each of the inner notch portions 37A and 37B is equal to half or more of a dimension w1 in the axial direction Da of a portion where the inner notch portions 37A and 37B are not provided, of the inner coil ends 34. In the present embodiment, a case where the depth dimension d1 of each of the inner notch portions 37A and 37B is equal to half of the dimension w1 in the axial direction Da is exemplified.

As with each of the inner coil ends 34, each of the outer coil ends 35 includes an outer notch portion 38A and an outer notch portion 38B at positions (see FIG. 4) overlapping with the outer coil ends 35 of the armature coils 32 for the other phases adjacent in the axial direction Da, as viewed from the axial direction Da. Each of the outer notch portions 38A and 38B houses the corresponding outer coil end 35 of the armature coil 32 for the other phase from the axial direction Da. Each of the outer notch portions 38A and 38B exemplified in the present embodiment also has a square groove shape having a width slightly greater than a width of the corresponding outer coil end 35 of the armature coil 32 for the other phase, as with each of the inner notch portions 37A and 37B. A depth dimension d2 of each of the outer notch portions is equal to half or more of a dimension w2 in the axial direction Da of a portion where the outer notch portions 38A and 38B are not provided, of the inner coil ends 35. In the present embodiment, a case where the depth dimension d2 of each of the outer notch portions is equal to half of the dimension w2 in the axial direction Da and the dimension w1 and the dimension w2 are equal to each other is exemplified.

For example, in a case of the winding portions 33 of the coil 32V, one winding portion 33 includes, on a first side Dc1 in the circumferential direction, the inner notch portion 37A housing the corresponding inner coil end 34 of the coil 32U, and the outer notch portion 38A housing the corresponding outer coil end 35 of the U-phase coil. On the other hand, the one winding portion 33 includes, on a second side Dc2 in the circumferential direction, the inner notch portion 37B housing the corresponding inner coil end 34 of the coil 32W, and the outer notch portion 38B housing the corresponding outer coil end 35 of the coil 32W. In other words, one winding portion 33 of the armature coils 32 includes two inner coil ends 34 and two outer coil ends 35, The two inner notch portions 37A and 37B are formed so as to open on sides opposite to each other in the axial direction Da.

Likewise, the two outer notch portions 38A and 38B are formed so as to open on sides opposite each other in the axial direction Da.

Therefore, when the coil 32U, the coil 32V, and the coil 32W are overlapped with one another in the axial direction Da, the inner notch portions 37A and 37B of the adjacent armature coils 32 face and house each other, and the outer notch portions 38A and 38B of the adjacent armature coils 32 face and house each other. This makes it possible to reduce a dimension in the axial direction Da of each stator 30 that is a coil assembly including the overlapped coils 32U, 32V, and 32W, to about a dimension in the axial direction Da of one armature coil 32.

Each of the coil slots 36 includes a plurality of stacked plate portions 39. The plurality of stacked plate portions 39 are stacked in a direction intersecting the axial direction Da. The stacked plate portions 39 are made of a metal such as copper that is the same as the material of the outer coil ends 35 and the inner coil ends 34. Each of these stacked plate portions 39 has a thickness in the stacked direction (hereinafter, simply referred to as stacked direction) less than a skin depth to a frequency of a current flowing through the coil slots 36. For example, a skin depth d can be determined by an expression $d = (2\rho/\omega\mu)^{1/2}$, where $\omega$ is an angular frequency, $\rho$ is resistivity, and $\mu$ is magnetic permeability.

Each of the stacked plate portions 39 according to the first embodiment is formed in a belt shape having a constant width dimension and a constant thickness.

The above-described stators 30 are of a careless type not including a core such as an iron core. Magnetic permeability of copper forming the armature coils 32 is equivalent to magnetic permeability of air, Therefore, in the coil slots 36 of the armature coils 32 disposed as illustrated in FIG. 4, magnetic fluxes generated from the armature coils 32 for the other phases adjacent in the axial direction Da are easily interlinked. A magnitude of an eddy current generated by interlinkage of the magnetic fluxes is proportional to a plate thickness. Therefore, when the plurality of stacked plate portions 39 each having the thickness less than the skin depth d are stacked as described above, the eddy current generated by the interlinkage of the magnetic fluxes can be reduced. The stacked plate portions 39 exemplified in the present embodiment extend in the radial direction Dr that is the extending direction of the coil slots 36. However, it is sufficient for the stacked plate portions 39 to extend in a direction intersecting the axial direction Da in which the magnetic fluxes are interlinked.

[Case 40]

As illustrated in FIG. 1, the case 40 houses the rotors 20 and the stators 30, and rotatably supports the rotary shaft 10.

Figure 8:
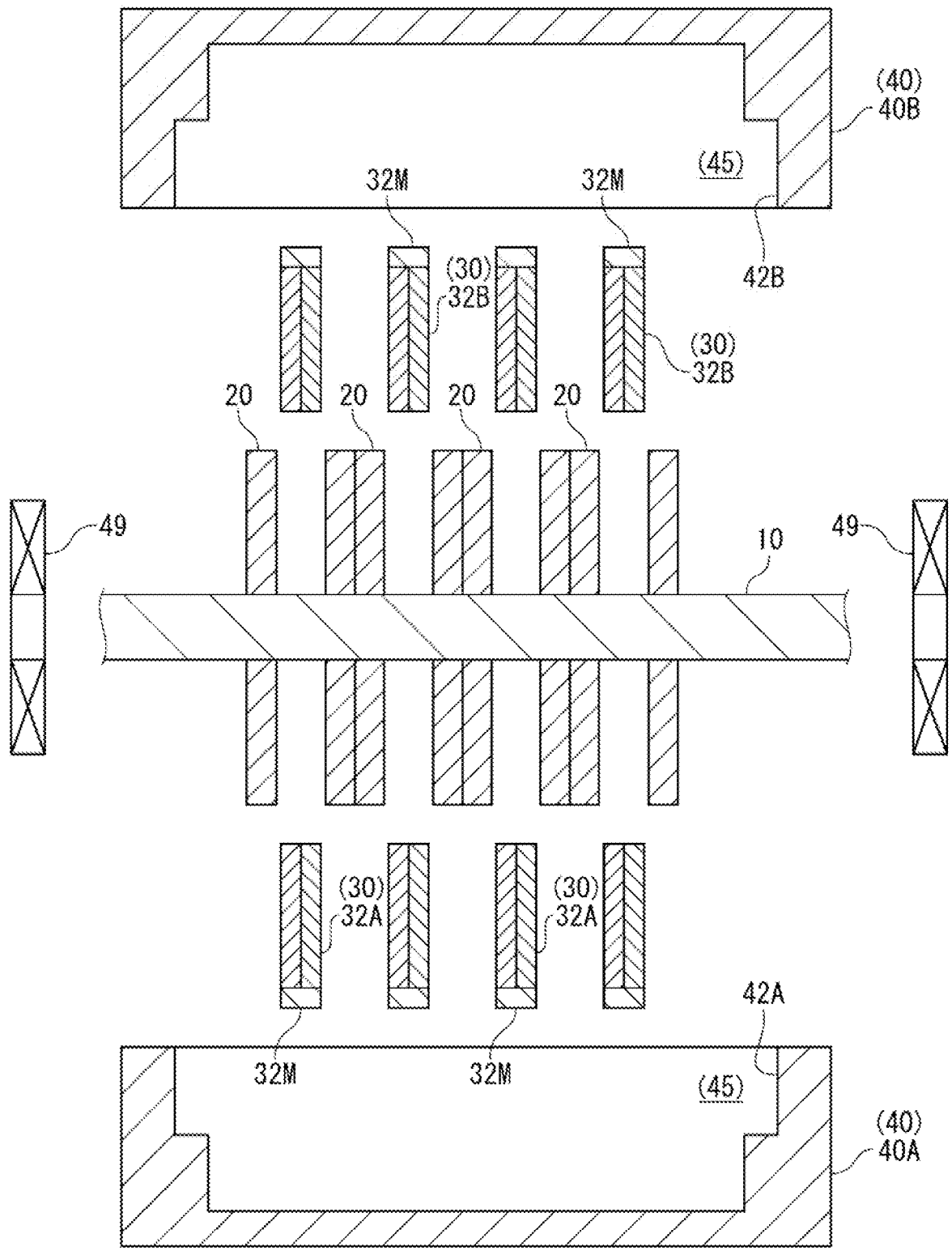
FIG. 8 is a diagram illustrating the rotary electric machine in FIG. 1 in an exploded manner.

As illustrated in FIG. 1 and FIG. 8, the case 40 according to the present embodiment includes a first case segment. 40A and a second case segment 40B divided in the vertical direction V. The first case segment 40A is disposed on a lower side in the vertical direction V, and the second case segment 40B is disposed on an upper side in the vertical direction. V. An opening 42A of the first case segment 40A and an opening 42B of the second case segment 40B abut on each other to form a housing chamber 45. The rotary shaft 10, the rotors 20, and the stators 30 are housed in the housing chamber 45.

The case 40 includes shaft holes 46 and 47 at respective ends in the axial direction Da. The rotary shaft. 10 is supported by the bearings 49 while being inserted into the shaft holes 46 and 47. The bearings 49 are supported between the first case segment 40A and the second case segment 403.

[Rotary Electric Machine System 1]

As illustrated in FIG. 7, the rotary electric machine system 1 according to the present embodiment includes the rotary electric machine 100 functioning as an electric motor, and the power converter 200 that converts power supplied from an external power supply and supplies power to the rotary electric machine 100. In FIG. 7, illustrations of the stators 30 of the rotary electric machine 100 are omitted.

[Power Converter 200]

The power converter 200 includes a plurality of converters 71 and a plurality of inverters 72, Each of the converters 71 converts an alternating current from an external alternating-current power supply into a direct current, and each of the inverters 72 converts the direct current received from the corresponding converter 71 into an alternating current, and supplies the alternating current to the rotary electric machine 100.

The converters 71 are connected to the armature coils 32 of the plurality of stators 30. As an example, three converters 71 are provided for one stator 30, and convert alternating-current power supplied from the U-phase, the V-phase, and the 32-phase of the alternating-current power supply into direct-current power. Note that, as each of the converters 71, a rectification circuit using a diode, or a bridge circuit by a switching element is usable.

Each of the inverters 72 is connected between a corresponding one of the plurality of converters 71 and a corresponding one of the armature coils 32 of the stators 30. In other words, one inverter 72 is connected to one converter 71. Each of the inverters 72 converts a direct-current output of the corresponding converter 71 into an alternating-current output. Among the plurality of inverters 72, output terminals of the plurality of inverters 72 performing the alternating-current output of the same phase are connected in series, More specifically, output terminals of a plurality of inverters 72U performing the alternating-current output of the U-phase are connected in series, output terminals of a plurality of inverters 72V performing the alternating-current output of the V-phase are connected in series, and output terminals of a plurality of inverters 72W performing the alternating-current output of the W-phase are connected in series. A case where a power line UL of the U-phase in which the inverters 72U are connected in series, a power line VL of the V-phase in which the inverters 72V are connected in series, and a Power line WL of the W-phase in which the inverters 72W are connected in series are connected at a neural point to form Y connection is exemplified. However, the connection form may be other connection form without being limited to the Y connection.

Note that the number of installed converters 71 and the number of installed inverters 72 are not limited to the above-described numbers. In a case where a rated current of each of the converters 71 and the inverters 72 is small or other cases, the plurality of converters 71 and the plurality of inverters 72 may be connected in parallel and used.

[Method of Manufacturing Rotary Electric Machine 100]

Next, a procedure of manufacturing the rotary electric machine 100 is described with reference to FIG. 8 to FIG. 11.

FIG. 8 illustrates elements of the rotary electric machine 100 in an exploded manner. These elements are assembled in order to manufacture the rotary electric machine 100. It is assumed that the rotors 20 are previously assembled to the rotary shaft 10; however, a procedure of assembling the rotors 20 to the rotary shaft. 10 is actually performed in advance.

Figure 9:
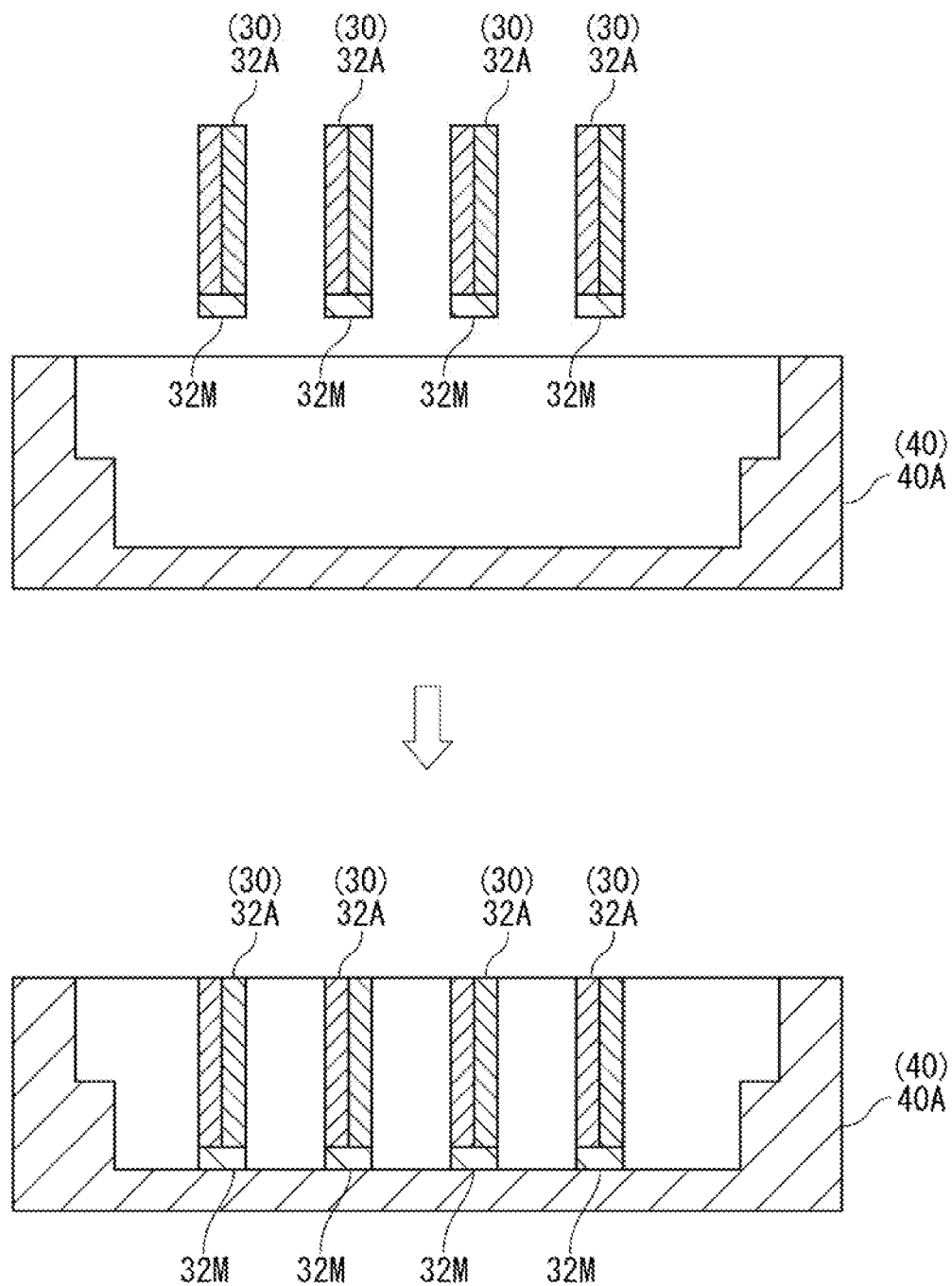
FIG. 9 is a diagram illustrating a procedure of manufacturing the rotary electric machine according to the first embodiment.

First, as illustrated in FIG. 9, first coil segments 32A of the stators 30 are attached to the first case segment 40A. The predetermined number of first coil segments 32A are attached with intervals for arrangement of the rotors 20 in the axial direction Da. The first coil segments 32A are fixed to an inner peripheral surface of the first case segment 40A through, for example, unillustrated molds. Second coil segments 32B are fixed to the second case segment 40B in a similar manner.

Although not illustrated, the second coil segments 32B are attached to predetermined positions of the second case segment 40B.

Figure 10:
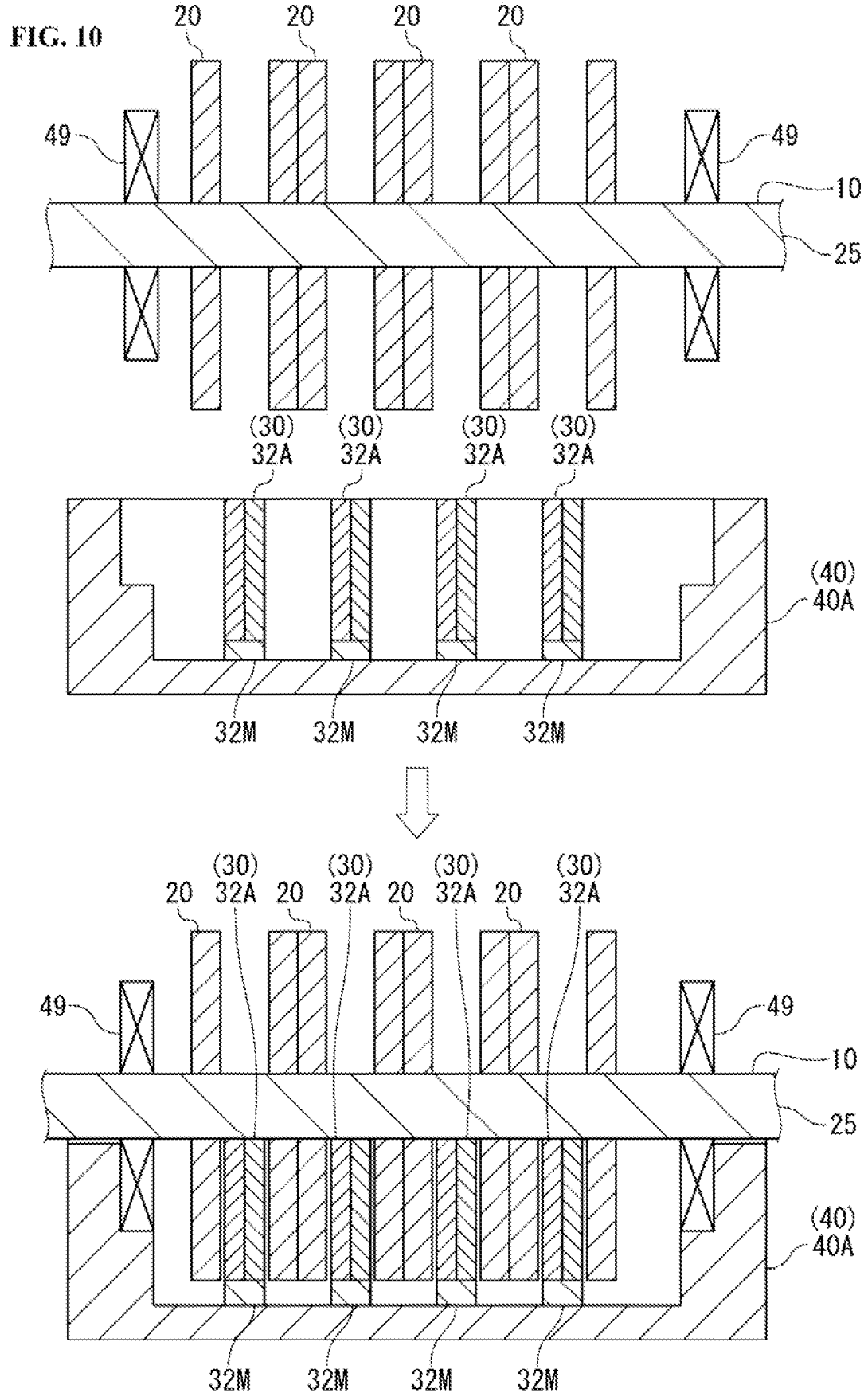
FIG. 10 is a diagram illustrating the procedure of manufacturing the rotary electric machine according to the first embodiment, subsequent to FIG. 9.

Next, as illustrated in FIG. 10, the rotary shaft 10 to which the plurality of rotors 20 have been assembled is supported by the first case segment 40A. The bearings 49 are attached to the respective ends of the rotary shaft 10 in the axial direction Da, and the rotary shaft 10 is placed on the first case segment 40A such that the bearings 49 are supported at respective ends of the first case segment 40A in the axial direction Da. The plurality of rotors 20 supported by the rotary shaft 10 are disposed to face the respective corresponding stators 30.

After the rotary shaft 10 and the rotors 20 are placed on the first case segment 40A, balance of the rotors 20 and the rotary shaft 10 can be adjusted. The balance adjustment work is performed after the rotors 20 and the rotary shaft 10 are rotated and a balance state is grasped. The balance adjustment work can be performed by well-known means.

Figure 11:
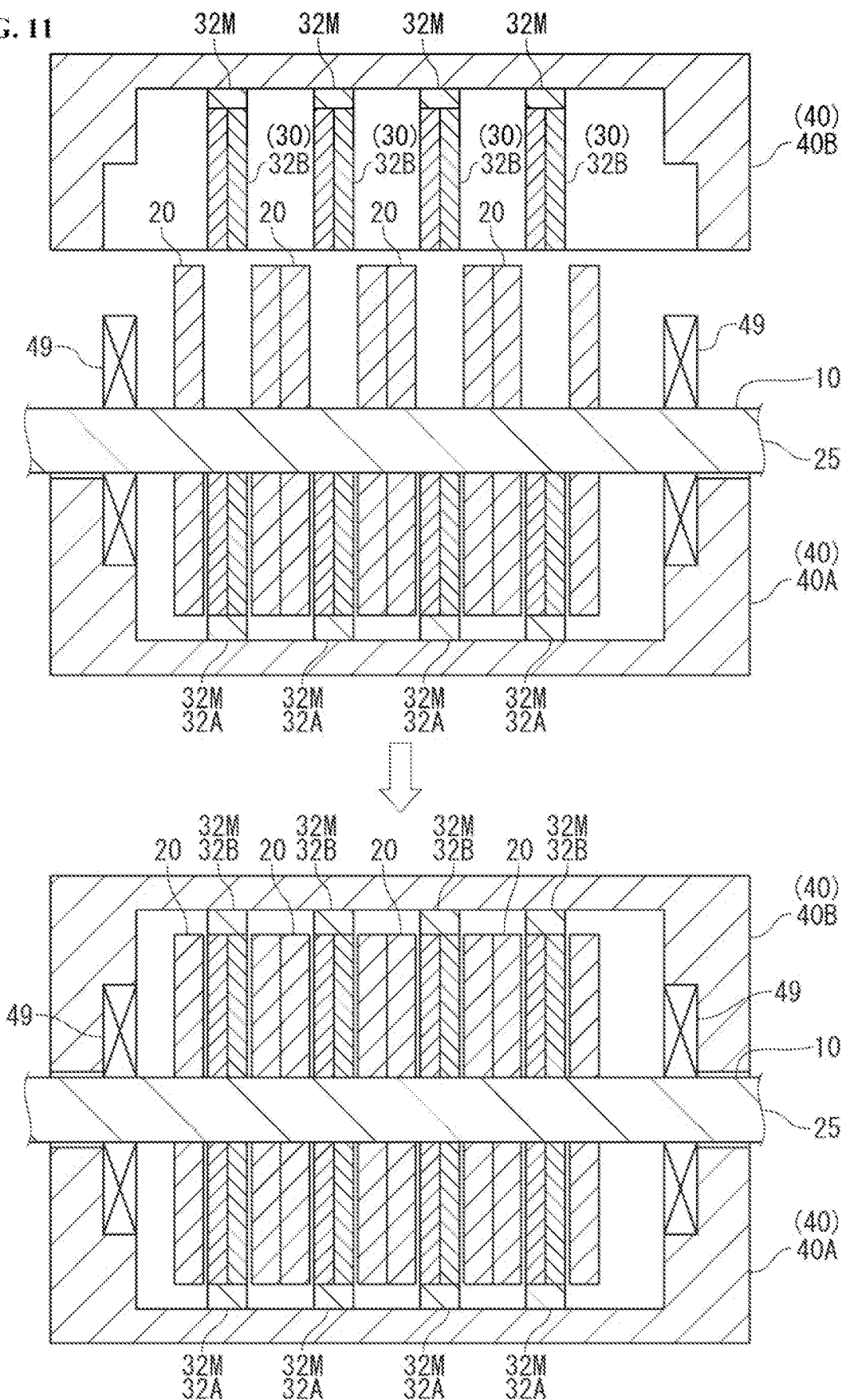
FIG. 11 is a diagram illustrating the procedure of manufacturing the rotary electric machine according to the first embodiment, subsequent to FIG. 10.

Next, as illustrated in FIG. 11, the second case segment 40B to which the second coil segments 32B have been attached is placed on the first case segment 40A supporting the rotary shaft 10. Although not illustrated, the first case segment 40A and the second case segment 40B are fixed to each other so as not to relatively move.

The rotary electric machine 100 can be obtained through the above-described procedure.

[Effects]

Next, effects achieved by the rotary electric machine 100 are described.

The rotary electric machine 100 includes the first coil segments 32A and the second coil segments 32B that are vertically divided from the stators 30, and the first case segment 40A and the second case segment. 40B that are vertically divided from the case 40. Accordingly, as illustrated in FIG. 10, a rotor assembly 25 in which the rotary shaft 10 and the rotors 20 are integrated can be installed in the first case segment 40A to which the first coil segments 32A of the stators 30 have been already fixed.

The rotor assembly 25 placed on the first case segment 40A may be out of balance as a rotating body. If being out of balance, the rotor assembly 25 rotated at high speed remarkably vibrates. Therefore, it is necessary to adjust the balance of the rotor assembly 25. In the present embodiment, since the rotor assembly 25 in which the rotary shaft 10 and the plurality of rotors 20 are integrated is placed on the first case segment 40A, it is possible to easily adjust the balance of the whole of the rotor assembly 25.

Second Embodiment

Figure 12:
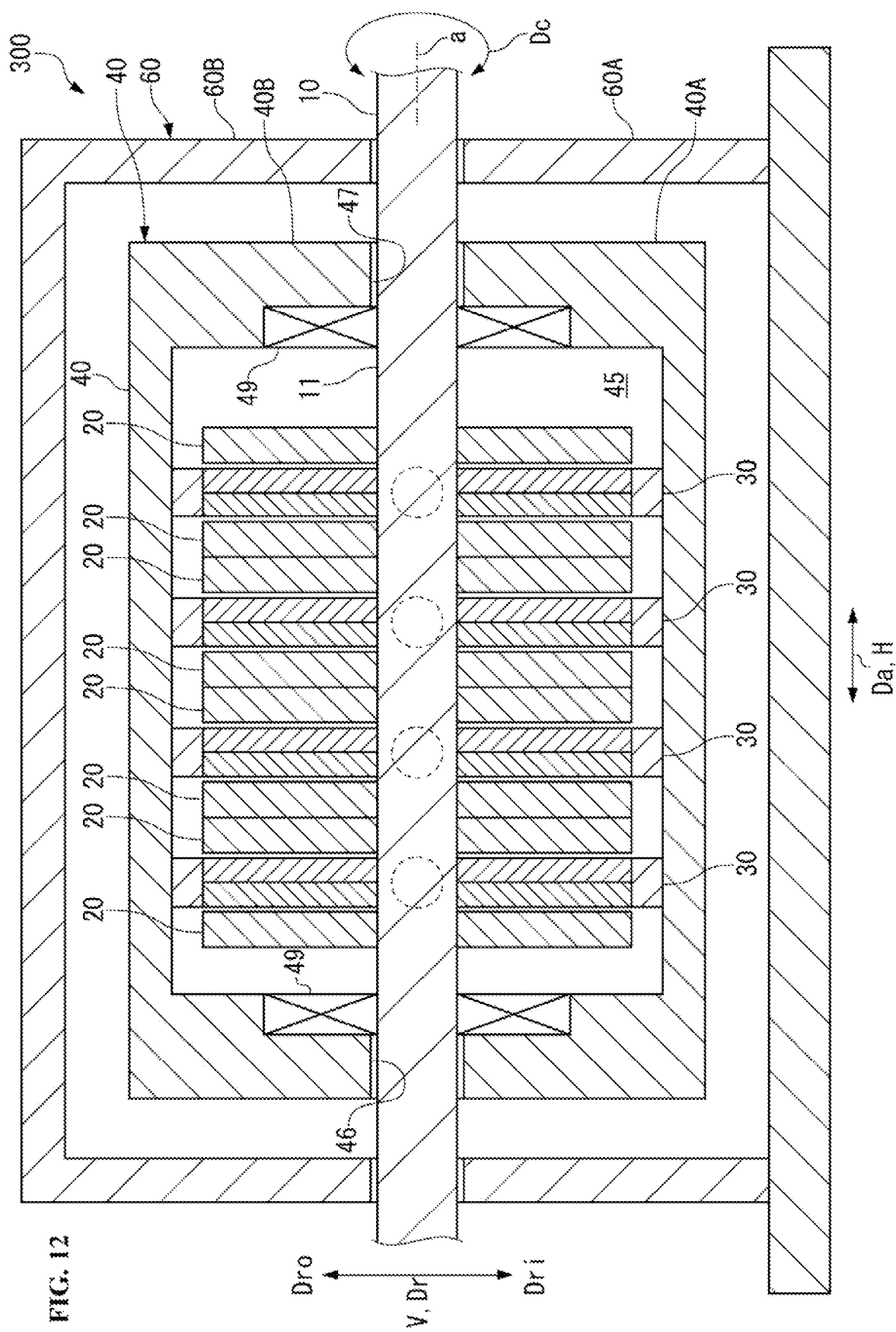
FIG. 12 is a vertical cross-sectional view illustrating a schematic configuration of a rotary electric machine according to a second embodiment of the present disclosure.
Figure 13:
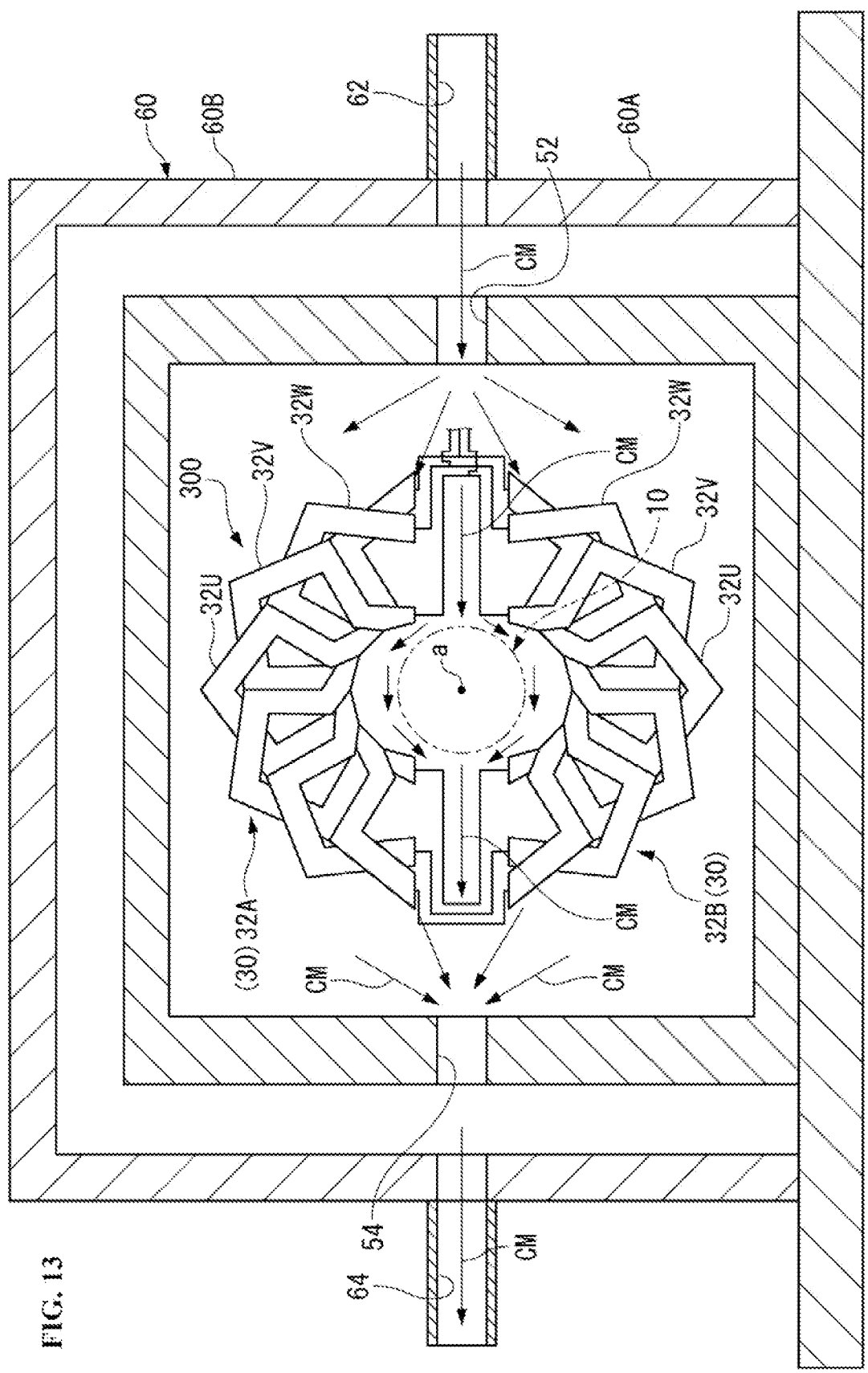
FIG. 13 is a partial cross-sectional view illustrating the rotary electric machine in FIG. 12 in an axial direction.

Next, a rotary electric machine 300 according to a second embodiment is described with reference to FIG. 12 and FIG. 13, The rotary electric machine 300 has a function of suppressing temperature increase of the armature coils 32 configuring the stators 30.

[Configuration]

The rotary electric machine 300 includes an outer case 60 covering a periphery of the case 40. In the following, the case 40 is referred to as an inner case 40 in order to make relationship with the outer case 60 clear. The outer case 60 includes a first outer case segment 60A that covers the first inner case segment 40A and is provided on the lower side in the vertical direction, and a second outer case segment 60B that covers the second inner case segment 40B and is provided on the upper side in the vertical direction. A predetermined gap is provided between the inner case 40 and the outer case 60.

The outer case 60 includes outer introduction ports 62 that guide a cooling medium CM supplied from an unillustrated supply source to an inside of the outer case 60, and outer discharge ports 64 that pass through the outer case 60 and the inner case 40 and discharges the cooling medium CM to an outside. Further, the inner case 40 includes inner introduction ports 52 from which the cooling medium CM is introduced, and inner discharge ports 54 from which the cooling medium CM is discharged. As illustrated in FIG. 13, each of the outer introduction ports 62 and the corresponding inner introduction port 52 are provided at positions coincident in the vertical direction V and the horizontal direction H, and each of the outer discharge ports 64 and the corresponding inner discharge port 54 are also provided at positions coincident in the vertical direction V and the horizontal direction H. In FIG. 12, the positions where the outer introduction ports 62, the inner introduction ports 52, the outer discharge ports 64, and the inner discharge ports 54 are provided are illustrated by dashed lines. The outer introduction ports 62, the inner introduction ports 52, the outer discharge ports 64, and the inner discharge ports 54 are provided at a plurality of positions in the horizontal direction H. In the present embodiment, the outer introduction ports 62 and the other ports are provided corresponding to the armature coils 32 to be cooled.

In the rotary electric machine 300, the cooling medium CM is blown to the armature coils 32 of the stators 30 to suppress temperature increase of the armature coils 32 during operation of the rotary electric machine 300. The type of the cooling medium CM is freely selectable as long as the cooling medium CM achieves the object, and a gas, for example air, cooled to an ordinary temperature or below the ordinary temperature can be used.

[Operation]

The cooling medium CM supplied from the supply source is introduced into the inside of the outer case 60 from the outer introduction ports 62, is further introduced into the inside of the inner case 40 from the inner introduction ports 52, and is used to cool the armature coils 32. The cooling medium CM used to cool the armature coils 32 is discharged from the inside of the outer case 60 to the outside of the outer case 60 through the inner discharge ports 54 and the outer discharge ports 64 of the outer case 60. For example, in a case where the cooling medium CM is air, the discharged cooling medium CM can be released to the atmosphere. Alternatively, a circulation path for the cooling medium CM in which the cooling medium CM discharged from the outer discharge ports 64 is collected, and is introduced from the outer introduction ports 62 into the outer case 60 can be provided.

[Effects]

According to the rotary electric machine 300, the cooling medium flows through the gaps between the first coil segments 32A and the second coil segments 32B on an inner diameter side of the armature coils 32 that is difficult to be cooled, which makes it possible to suppress temperature increase of the armature coils 32. In particular, since the armature coils 32 each have a coreless structure, the cooling medium enters the clearances inside the armature coils 32 to achieve high cooling capacity. On the other hand, even when the clearances are provided, the clearances hardly cause reduction of the torque.

The rotary electric machines according to the above-described embodiments are understood as follows.

[Rotary Electric Machine According to First Aspect]

Each of the axial-gap coreless rotary electric machines 100 and 300 according to a first aspect includes the rotors 20, the stators 30, and the case 40.

In the rotors 20, the field magnets 21 are fixed to the rotary shaft 10 with intervals in the axial direction a. The stators 30 each include the plurality of armature coils 32 disposed to face the Meld magnets 21. The case 40 houses the rotors 20 and the plurality of stators 30, and rotatably supports the rotary shaft 10.

In the present disclosure, the armature coils 32 each of the stators 30 include the first coil segment 32A and the second coil segment. 32B that is disposed to face the first coil segment 32A in the radial direction of the rotary shaft 10.

In the present disclosure, the case 40 includes the first case segment 40A and the second case segment 403 disposed to face the first case segment in the radial direction of the rotary shaft.

[Action and Effects by Rotary Electric Machine According to First Aspect]

In each of the rotary electric machines 100 and 300 according to the first aspect, the case 40 is divided into the first case segment 40A and the second case segment 403, and the armature coils 32 of each of the stators 30 are divided into the first coil segment 32A and the second coil segment 32B. As a result, the rotors 20 in which the field magnets 21 are attached to the rotary shaft 10 can be integrally disposed in the first case segment 40A including the plurality of first coil segments 32A disposed at the predetermined positions. Accordingly, balance of the rotors 20 disposed in the first case segment 40A can be integrally adjusted. As a result, in each of the rotary electric machines 100 and 300 including the combination of the plurality of rotors 20 and the plurality of stators 30, it is possible to suppress vibration caused by imbalance of the rotors 20,

[Rotary Electric Machine According Lo Second Aspect]

In each of the rotary electric machines 100 and 300 according to a second aspect, preferably, the first coil segment 32A and the second coil segment 32B each serve as half of a period of each of the armature coils 32.

[Action and Effects by Rotary Electric Machine According to Second Aspect]

In each of the rotary electric machines 100 and 300 according to the second aspect, the first coil segment 32A and the second coil segment 32B may have the same shape and the same dimension. Accordingly, a uniform magnetic field can be generated in the circumferential direction of the armature coils 32. This makes it possible to stabilize rotation of the rotors 20.

[Rotary Electric Machine According to Third Aspect]

The armature coils 32 of each of the rotary electric machines 100 and 300 according to a third aspect include the first coil 32U, the second coil 32V, and the third coil 32W different in phase around the axis a of the rotary shaft 10 from one another.

The first coil segment 32A according to the third aspect includes a first-A coil element configuring a part of the first coil 32U, a first-B coil element configuring a part of the second coil 32V, and a first-C coil element configuring a part of the third coil 32W. Further, the second coil segment according to the third aspect includes a first-a coil element configuring another part of the first coil 32U, a first-b coil element configuring another part of the second coil 32V, and a first-c coil element configuring another part of the third coil 32W.

[Action and Effects by Rotary Electric Machine According to Third Aspect]

Each of the rotary electric machines 100 and 300 according to the third aspect is applied to a three-phase alternating-current rotary electric machine.

[Rotary Electric Machine According to Fourth Aspect]

In each of the rotary electric machines 100 and 300 according to a fourth aspect, preferably, the first coil segment 32A and the second coil segment 32B are divided in the vertical direction.

[Action and Effects by Rotary Electric Machine According to Fourth Aspect]

In each of the rotary electric machines 100 and 300 according to the fourth aspect, it is possible to easily install the first coil segment 32A in the first case segment 40A, and to easily install the second coil segment 32B in the second case segment 403.

[Rotary Electric Machine According to Fifth Aspect]

In each of the rotary electric machines 100 and 300 according to a fifth aspect, preferably, the first case segment. 40A and the second case segment. 40B are divided in the vertical direction.

[Action and Effects by Rotary Electric Machine According to Fifth Aspect]

In each of the rotary electric machines 100 and 300 according to the fifth aspect, the rotors 20 can be easily installed in the first case segment 40A.

[Rotary Electric Machine According to Sixth Aspect]

Each of the rotary electric machines 100 and 300 according to a sixth aspect preferably further includes a cooling mechanism configured to supply a cooling medium into the case.

[Action and Effects by Rotary Electric Machine According to Sixth Aspect]

Each of the rotary electric machines 100 and 300 according to the sixth aspect can effectively cool the armature coils 32.

A method of manufacturing the rotary electric machine according to any of the above-described embodiments is understood as follows.

[Method of Manufacturing Rotary Electric Machine According to First Aspect]

The present disclosure provides a method of manufacturing the above-described axial-gap careless rotary electric machine including the rotors, the stators, and the case. The manufacturing method includes the following first step, second step, and third step.

First step: preparing a first case segment including a plurality of first coil segments disposed at predetermined positions.

Second step: disposing the rotors in which the field magnets are attached to the rotary shaft, predetermined positions of the first case segment.

Third step: abutting a second case segment including a plurality of second coil segments disposed at predetermined positions, to the first case segment.

In the manufacturing method according to the present disclosure, the case includes the first case segment and the second case segment, and the armature coils include the first coil segment and the second coil segment.

[Action and Effects by Method of Manufacturing Rotary Electric Machine According to First Aspect]

According to the method of manufacturing the rotary electric machine of the first aspect, the case 40 is divided into the first case segment 40A and the second case segment. 40B, and the armature coils 32 of each of the stators 30 are divided into the first coil segment 32A and the second coil segment 32E. As a result, the rotors 20 in which the field magnets 21 are attached to the rotary shaft 10 can be integrally disposed in the first case segment 40A including the plurality of first coil segments 32A disposed at the predetermined positions. Accordingly, balance of the rotors 20 disposed in the first case segment 40A can be integrally adjusted. As a result, in each of the rotary electric machines 100 and 300 each including the combinations of the plurality of rotor 20 and the plurality of stators 30, it is possible to suppress vibration caused by imbalance of the rotors 20.

[Method of Manufacturing Rotary Electric Machine According to Second Aspect]

In the method of manufacturing the rotary electric machine according to the first aspect, preferably, balance of the rotors is adjusted between the second step and the third step.

[Action and Effects by Method of Manufacturing Rotary Electric Machine According to Second Aspect]

According to the method of manufacturing the rotary electric machine of the second aspect, in each of the rotary electric machines 100 and 300 each including the combination of the plurality of rotors 20 and the plurality of stators 30, it is possible to easily suppress vibration caused by imbalance of the rotors 20.

[Supplement]

Other than the above description, the configurations described in the above-described embodiments can be selected or appropriately modified to other configurations.

For example, in the embodiments, the most preferable example in which the case 40 is divided into the first case segment 40A and the second case segment 40B in the vertical direction V is described. In the present disclosure, however, the case 40 can be divided in the horizontal direction H as long as the balance of the rotors 20 can be integrally adjusted. In this case, the plurality of rotors 20 and the rotary shaft 10 are supported by the other member until the first case segment 40A and the second case segment 40B are assembled.

In addition to the case 40, the armature coils 32 can also be divided in the direction other than the vertical direction V. In other words, in the embodiments, the armature coils 32 are also divided in the vertical direction V corresponding to dividing of the case 40 in the vertical direction V. For example, when the case 40 is divided in the horizontal direction H, the armature coils 32 can be divided in the horizontal direction H corresponding thereto.

The armature coils 32 described in the embodiments have preferable forms. However, the armature coils applied to the present disclosure are not limited as long as the armature coils can serve as stators to generate magnetic fields even when the armature coils are divided into two parts.

REFERENCE SIGNS LIST

1 Rotary electric machine system
10 Rotary shaft
11 Outer peripheral surface
13 Convex portion
20 Rotor
21 Field magnet 21A Magnetic block
21I Inner peripheral surface
22 Inner ring portion
22A First block
22K Key groove
23 Torque transmission portion
23C Contact surface
23K Key
23O Outer surface
23S Spring
24 Outer ring portion
25 Rotor assembly
30 Stator
32 Armature coil
32A First coil segment
32B Second coil segment
32U First coil
32UA Coil element (first-A coil element)
32UB Coil element (first-a coil element)
32V Second coil
32VA Coil element (first-B coil element)
32VB Coil element (first-b coil element)
32W Third coil
32WA Coil element (first-C coil element)
32WB Coil element (first-c coil element)
33 winding portion
34 Inner coil end
35 Outer coil end
35C Corner part
36 Coil slot
37A, 37B Inner notch portion
38A, 38B Outer notch portion
39 Stacked plate portion
40 Case
40A First case segment
40B Second case segment
42A, 42B Opening
45 Housing chamber
46, 47 Shaft hole
49 Bearing
52 Inner introduction port
54 Inner discharge port
60 Outer case
60A First outer case segment
60B Second outer case segment
62 Outer introduction port
64 Outer discharge port
71 Converter
72, 72U, 72V, 72W Inverter
100 Rotary electric machine
200 Power converter
300 Rotary electric machine
UL, VL, WL Power line
CM Cooling medium

The invention claimed is:

1. An axial-gap coreless rotary electric machine, comprising:
a rotor assembly including a rotary shaft and rotors that are integrated;
stators;
an inner case configured to: (i) house the rotors and the stators; and (ii) rotatably support the rotary shaft; and
an outer case covering a periphery of the inner case, wherein:
the rotors include field magnets that are fixed to the rotary shaft with intervals in an axial direction;
each of the stators includes armature coils facing at least one of the field magnets;
each of the armature coils includes a first coil segment and a second coil segment facing the first coil segment;
the inner case includes a first case segment and a second case segment facing the first case segment;
the rotor assembly is attached to the first case segment;
the outer case includes an outer introduction port configured to guide a cooling medium to an inside of the outer case;
the inner case includes an inner introduction port configured to introduce the cooling medium to an inside of the inner case;
the inner case includes an inner discharge port configured to discharge the cooling medium to an outside of the inner case; and
the outer case includes an outer discharge port configured to discharge the cooling medium to an outside of the outer case.

2. The axial-gap coreless rotary electric machine according to claim 1, wherein the first coil segment is a first half of a period of one of the armature coils, and the second coil segment is a second half of the period of the one of the armature coils.

3. The axial-gap coreless rotary electric machine according to claim 1, wherein the armature coils include a first coil, a second coil, and a third coil different in phase around an axis of the rotary shaft from one another.

4. The axial-gap coreless rotary electric machine according to claim 1, wherein the first coil segment and the second coil segment are divided in a vertical direction.

5. The axial-gap coreless rotary electric machine according to claim 1, wherein the first case segment and the second case segment are divided in a vertical direction.

6. A method of manufacturing the axial-gap coreless rotary electric machine according to claim 1, the method comprising:
preparing the first case segment with the first coil segments of the armature coils disposed at predetermined stator positions;
disposing the rotors at predetermined rotor positions of the first case segment; and
abutting the second case segment to the first case segment.

7. The method according to claim 6, further comprising adjusting a balance of the rotors between: (i) the disposing of the rotors at the predetermined rotor positions of the first case segment; and (ii) the abutting of the second case segment to the first case segment.

8. The axial-gap coreless rotary electric machine according to claim 1, wherein the outer introduction port, the inner introduction port, the inner discharge port and the outer discharge port are concentric.

9. The axial-gap coreless rotary electric machine according to claim 1, wherein:
the outer introduction port is one of a plurality of outer introduction ports positioned along the axial direction;
the inner introduction port is one of a plurality of inner introduction ports positioned along the axial direction;
the inner discharge port is one of a plurality of inner discharge ports positioned along the axial direction; and
the outer discharge port is one of a plurality of outer discharge ports positioned along the axial direction.

10. The axial-gap coreless rotary electric machine according to claim 1, wherein the cooling medium is a gas.

11. The axial-gap coreless rotary electric machine according to claim 1, wherein the cooling medium is air.

* * * * *